(12) United States Patent
Englin et al.

(10) Patent No.: US 6,799,249 B1
(45) Date of Patent: Sep. 28, 2004

(54) SPLIT CONTROL FOR IP READ AND WRITE CACHE MISSES

(75) Inventors: Donald C. Englin, Shoreview, MN (US); Kelvin S. Vartti, Hugo, MN (US)

(73) Assignee: Unisys Corporation, Blue Bell, PA (US)

( * ) Notice: Subject to any disclaimer, the term of this patent is extended or adjusted under 35 U.S.C. 154(b) by 486 days.

(21) Appl. No.: 09/651,598

(22) Filed: Aug. 30, 2000

(51) Int. Cl.[7] .............................................. G06F 12/00
(52) U.S. Cl. ........................ 711/125; 711/122; 711/133
(58) Field of Search ................................. 711/118, 119, 711/122, 123, 124–125, 133; 710/38–39

(56) References Cited

U.S. PATENT DOCUMENTS

| | | | | |
|---|---|---|---|---|
| 5,202,972 A | * | 4/1993 | Gusefski et al. ............ 711/123 |
| 5,603,005 A | * | 2/1997 | Bauman et al. ............. 711/124 |
| 6,021,467 A | * | 2/2000 | Konigsburg et al. ........ 711/122 |
| 6,145,054 A | * | 11/2000 | Mehrotra et al. ........... 711/119 |
| 6,269,425 B1 | * | 7/2001 | Mounes-Toussi et al. ... 711/133 |
| 6,275,906 B1 | * | 8/2001 | Nunez et al. ............... 711/141 |
| 6,430,654 B1 | * | 8/2002 | Mehrotra et al. ........... 711/118 |

* cited by examiner

*Primary Examiner*—Pierre M. Vital
(74) *Attorney, Agent, or Firm*—Charles A. Johnson; Mark T. Starr; Nawrocki, Rooney & Sivertson, P.A.

(57) ABSTRACT

An apparatus for and method of queuing memory access requests resulting from level two cache memory misses. The requests are preferably queued separately by processor. To provide the most recent data to the system, write (i.e., input) requests are optimally given preference over read (i.e., output) requests for input/output processors. However, instruction processor program instruction fetches (i.e., read-only requests) are preferably given priority over operand transfers (i.e., read/write requests) to reduce instruction processor latency.

20 Claims, 6 Drawing Sheets

SPLIT CONTROL FOR IP READ AND WRITE CACHE MISSES

CROSS REFERENCE TO CO-PENDING APPLICATIONS

The present invention is related to commonly assigned and co-pending U.S. patent application Ser. No. 09/650,730 filed Aug. 30, 2000, entitled "Leaky Cache Mechanism"; U.S. patent application Ser. No. 09/651,597 filed Aug. 30, 2000, entitled "Method for Avoiding Delays During Snoop Requests"; U.S. patent application Ser. No. 09/651,488, filed Aug. 30, 2000, entitled "Method for Managing Flushes within the Cache"; and U.S. patent application Ser. No. 09/650,800 filed Aug. 30, 2000, entitled "Method for Improved First Level Cache Coherency" which are incorporated.

BACKGROUND OF THE INVENTION

1. Field of the Invention

The present invention generally relates to methods and apparatus for controlling access to a level two cache memory by multiple users and more particularly relates to queuing of multiple cache request misses.

2. Description of the Prior Art

It is known in the prior, art to develop computer systems having cache memory(s) built into the basic architecture. The two fundamental characteristics of any memory unit are capacity (i.e., number of storage cells) and speed. The cost of a memory unit is, of course, increased with increased capacity and/or increased speed. Because of the time delays necessitated by increased size, memory systems which are both very large in capacity and very fast tend to be cost prohibitive.

Therefore, for virtually all general purpose computers, cost requirements dictate that the main storage subsystem will operate more slowly than the processor(s) which it serves. Therefore, there tends to be a constant mismatch between the rate at which data is to be accessed from the main storage subsystem and the rate at which that data is processed. Thus, a constant performance issue with computer design is related to reduction of the latencies associated with the wait between a processor request for memory access and the time when that request is actually honored by the main storage subsystem.

A common technique for matching a relatively high speed processor to a relatively low speed main storage subsystem is to interpose a cache memory in the interface. The cache memory is much faster but of much smaller capacity than the main storage subsystem. Data requested by the processor is stored temporarily in the cache memory. To the extent that the same data remains within the cache memory to be utilized more than once by the processor, substantial access time is saved by supplying the data from the cache memory rather than from the main storage subsystem. Further savings are realized by loading the cache memory with blocks of data located near the requested data under the assumption that other data will be soon needed from the loaded block.

There are additional issues to be considered with regard to cache memory design. Program instruction data, for example, tends to be quite sequential and involves only read accesses. However, operand data may involve both read an write accesses. Therefore, it is helpful to optimize cache memory design by dividing instruction processor cache memories into program instruction and operand portions.

Furthermore, if a computer system contains multiple processing units, provision must be made to ensure that data locations accessed by a first processing unit are provided as potentially modified by write operations from a second processor unit. This data coherency problem is usually solved via the use of store-through (i.e., write operands cause immediate transfer to main storage) or store-in (i.e., cache memory contains only updated data and flags are needed to show that main storage location contains obsolete data).

As the use of cache memory has become more common, it is now known to utilize multiple levels of cache memory within a single system. U.S. Pat. No. 5,603,005, issued to Bauman et al. on Feb. 11, 1997, incorporated herein by reference, contains a description of a system with three levels of cache memory. In the multiprocessor Bauman et al. system, each instruction processor has dedicated instruction (i.e., read-only) and operand (i.e., write-through) cache memories. This corresponds to level one cache memory.

A level two cache memory is located within each system controller. The level two cache memory of Bauman et al. is a store-in cache memory which is shared by all of the processors coupled to corresponding system controller. The system of Bauman et al. contains a level three cache which is coupled between each of the system controllers and a corresponding main memory unit.

As can be readily appreciated, if all of the processors coupled to a single system controller experience cache misses in their respective first level cache memories, each will make a near simultaneous request of the second level cache memory within the system controller. If all (or near all) of the near simultaneous requests to the second level cache memory are also misses, it is necessary to sequence the order in which these requests will be serviced from the third level cache memory and/or the main storage subsystem. The total latency is particularly long if misses are also experienced at the third level cache memory.

It has been common in the past to treat this condition using a single queue for all instruction processor requests. The queue is generally implemented as a simple FIFO. The simple FIFO has. some times been modified to place read request behind write requests in the queue to overcome potential data latency problems.

SUMMARY OF THE INVENTION

The present invention overcomes the disadvantages associated with the prior art by providing a way to queue two requests from the same IP in a more efficient manner when both requests experience SLC (second level cache) misses in the same time frame. In accordance with the present invention, the single FIFO (first-in-first-out) queue is replaced with two separate queues (a read queue and a write queue).

Each instruction processor can have one outstanding read request and one outstanding write request during the same time frame. If both requests to the SLC are misses, the second request can be sent over the same bus lines to the memory without waiting for the initial request miss to be completed. This improves the latency time for the second request back to the instruction processor. This will improve the performance of the instruction processor.

So in a fully populated system there are 16 instruction processors, each with its own SLC. With the prior method, up to 16 request misses could be held up waiting for the previous 16 miss requests to complete. With the current method, all 32 requests (16 read requests and 16 write request) would have been sent out through their respective busses to memory. Thus, the latency for the 16 previously held requests is reduced, and over all system performance is improved.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
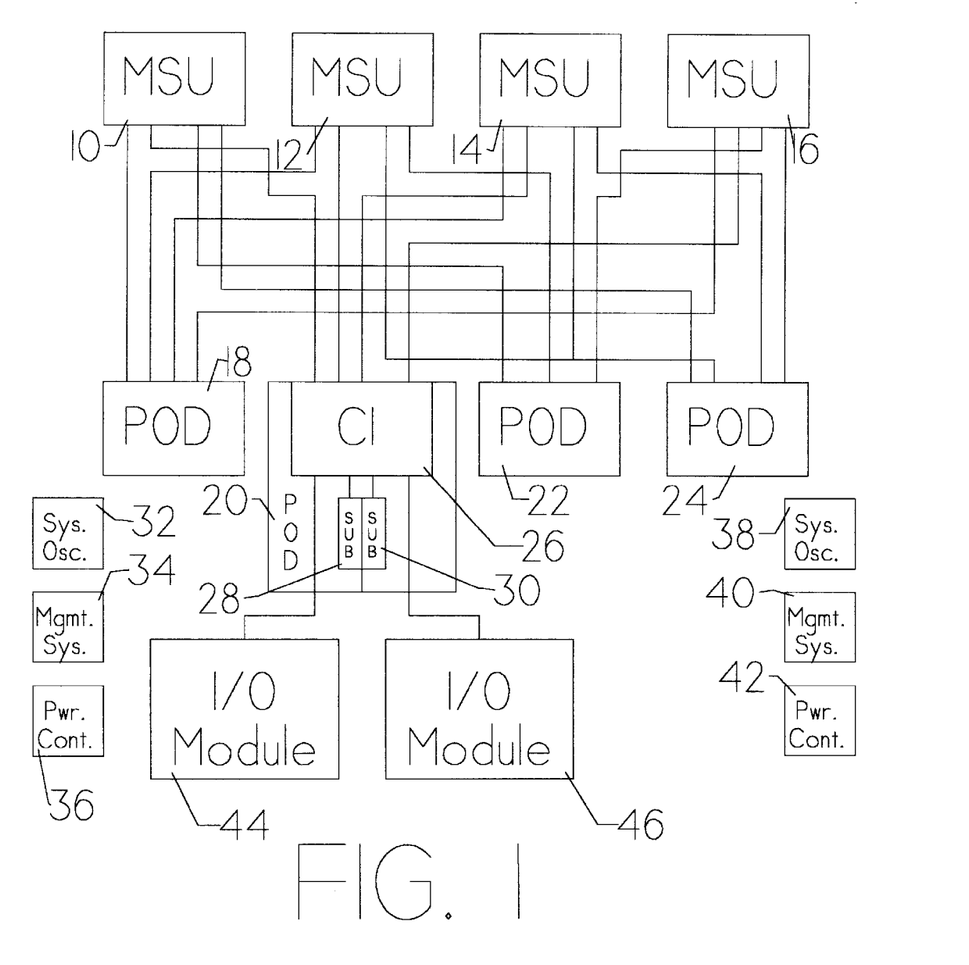
FIG. 1 is a functional block diagram of the major components of the preferred mode of the present invention.

FIG. 1 is an overall block diagram of fully populated data processing system according to the preferred mode of the present invention. This corresponds to the architecture of a commercial system of Unisys Corporation termed "Voyager".

The main memory of the system consists of up to four memory storage units, MSU 10, MSU 12, MSU 14, and MSU 16. Being fully modular, each of these four memory storage units is "stand-alone" and independent of one another. Each has a separate point-to-point dedicated bi-directional interface with up to four "pods", POD 18, POD 20, POD 22, POD 24. Again, each of the up to four pods is separate and independent of one another.

The contents of POD 20 are shown by way of example. For the fully populated system, POD 18, POD 22, and POD 24 are identical. to POD 20. The interface between POD 20 and each of the four memory storage units (i.e., MSU 10, MSU 12, MSU 14, and MSU 16), is via a third level cache memory designated cached interface, CI 26, in this view. CI 26 couples with two input/output controllers, I/O Module 44 and I/O Module 46, and two sub-pods, SUB 28 and SUB 30. A more detailed explanation of the POD 20 is provided below.

The above described components are the major data handling elements of the system. In the fully populated system shown, there are sufficient components of each type, such that no single hardware failure will render the complete system inoperative. The software employed within the preferred mode of the present system utilizes these multiple components to provide enhanced reliability for long term operation.

The remaining system components are utilitarian rather than data handling. System Oscillator 32 is the primary system time and clocking standard. Management System 34 controls system testing, maintenance, and configuration. Power Controller 36 provides the required electrical power. System Oscillator 38, Management System 40, and Power Controller 42 provide completely redundant backup capability.

Figure 2:
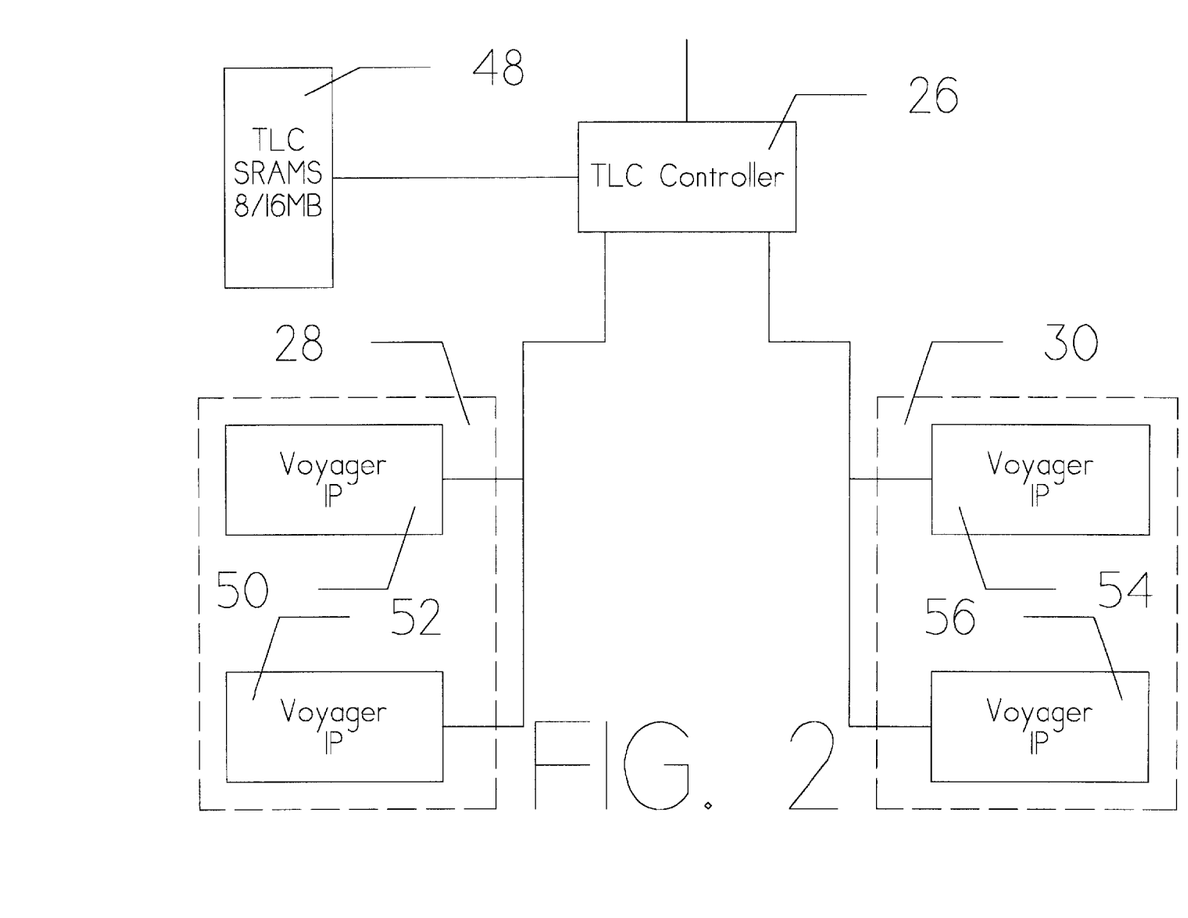
FIG. 2 is a functional block diagram of a single POD (Portion of Device)

FIG. 2 is a more detailed block diagram of POD 20. The level three cache memory interfaces directly with the memory storage units via TLC (Third Level Cache) Controller 26 (see also FIG. 1). The actual storage for the level three cache memory is TLC SRAMS 48. As indicated this static random access memory consists of eight 16 byte memory chips.

Subpod 28 and subpod 30 each contain up to two individual instruction processors. These are designated Voyager IP 50, Voyager IP 52, Voyager IP 54, and Voyager IP 56. As explained in detail below, each contains its own system controller. In accordance with the preferred mode of the present invention, these instruction processors need not all contain an identical software architecture.

Figure 3:
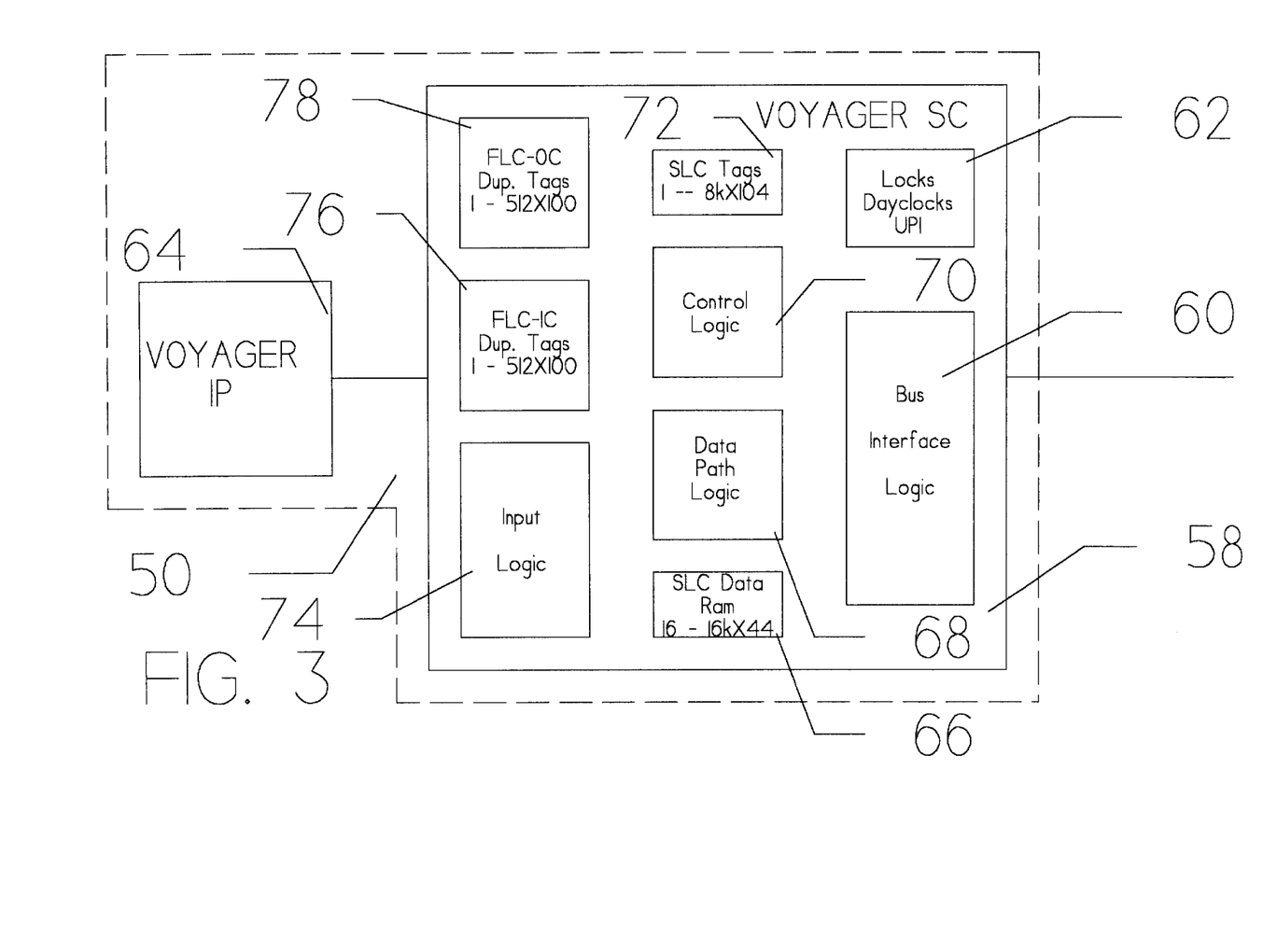
FIG. 3 is a functional block diagram of an instruction processor with dedicated second level cache memory in accordance with the present invention.

FIG. 3 is a more detailed block diagram of Voyager IP 50, located within Subpod 28, located within POD 20 (see also FIGS. 1 and 2). As explained above, each instruction processor has a dedicated system controller having a dedicated level two cache memory. Instruction processor 64 has two dedicated level one cache memories (not shown in this view). One level one cache memory is a read-only memory for program instruction storage. Instruction processor 64 executes its instructions from this level one cache memory. The other level one cache memory (also not shown in this view) is a read/write memory for operand storage.

Instruction processor 64 is coupled via its two level one cache memories and dedicated system controller 58 to the remainder of the system. System controller 58 contains input logic 74 to interface with instruction processor 64. In addition, data path logic 70 controls movement of the data through system controller 58. The utilitarian functions are provided by Locks, Dayclocks, and UPI (Uninterruptible Power Interface) 62. The remaining elements of system controller 58 provide the level two cache memory functions. SLC data ram 66 is the data actual storage facility. Control logic 70 provides the cache management function. SLC tags 72 are the tags associated with the level two cache memory. FLC-IC (First Level Cache-Instruction Cache) Dup. Tags 76 provides the duplicate tags for the level one instruction cache memory of instruction processor 64. Similarly, FLC-OC (First Level Cache-Operand Cache) Dup. Tags 78 provides the duplicate tags for the level one operand cache memory of instruction processor 64. For a more complete discussion of this duplicate tag approach, reference may be made with the above identified co-pending and incorporated U.S. Patent Applications.

Figure 4:
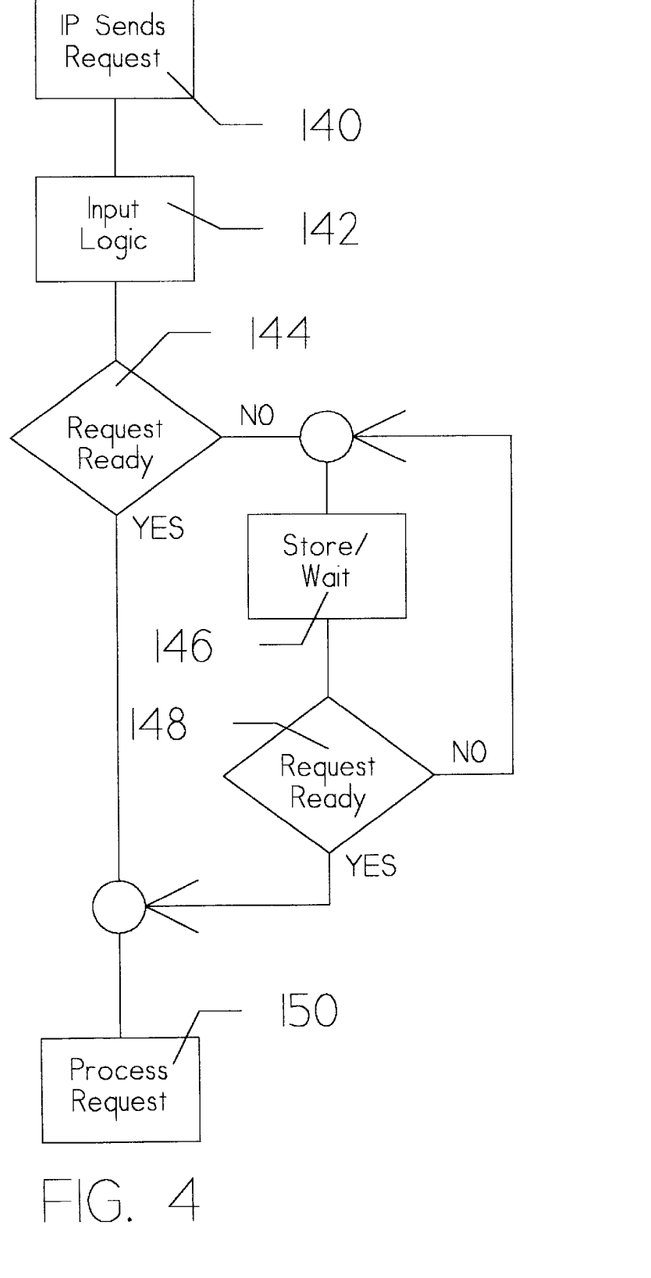
FIG. 4 is a flow chart showing queuing at one interface to the level two cache memory.

FIG. 4 is a flow chart showing the queuing process of a level two cache memory miss as seen from the requesting processor. The instruction processor (see also FIG. 3), having experienced a level one cache memory miss, sends a memory access to the system controller at element 140. At element 142, the system controller processes the memory access request resulting in a miss at the level two cache memory.

Element 144 determines whether priority is to be given to the subject memory access request. If no, control is given to element 146 which stores the request in the queue and element 148 determines whether priority is to be granted. If no, control remains with elements 146 and 148 until priority is available. Control is given to element 150 to process the memory access request whenever given control by element 144 or element 148. Because the instruction processor is highly pipelined, this queue delay may or may not produce latency of the instruction processor.

Figure 5:
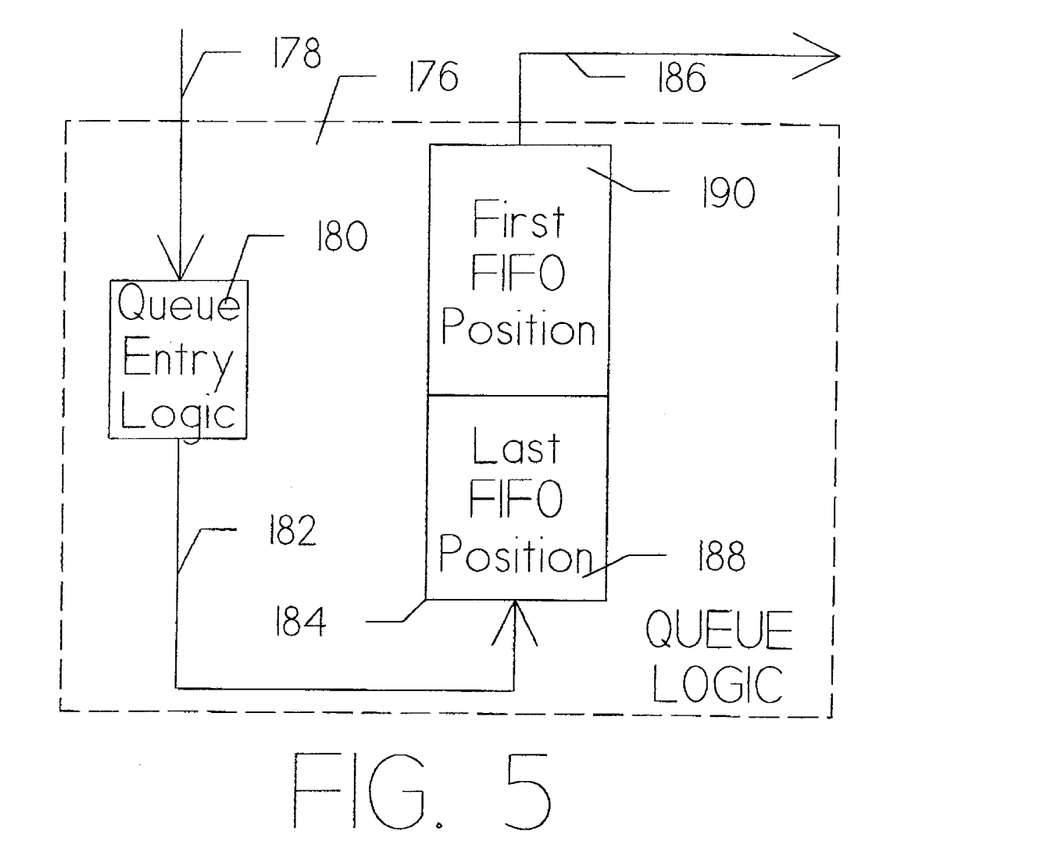
FIG. 5 is a detailed diagram showing a single queue.

FIG. 5 is a detailed functional diagram of queue logic 176 showing the process of queuing two level two misses within a single FIFO. Each identified request is sent after the level two miss (see also FIGS. 2 and 3) via path 178 to queue entry logic 180 to be prepared for storage. The prepared request is transferred via path 182 for transfer to FIFO 184. The single FIFO is appropriate in that each instruction processor has both a program instruction read-only interface and a read/write operand, transfer interface.

Whereas each newly prepared request is loaded into the last FIFO position 188, prepared requests to be honored are taken from first FIFO position 190. The prepared request to be honored is transferred via path 186. Prepared requests are transferred up from last position 188 to first position 190 in the known fashion.

Figure 6:
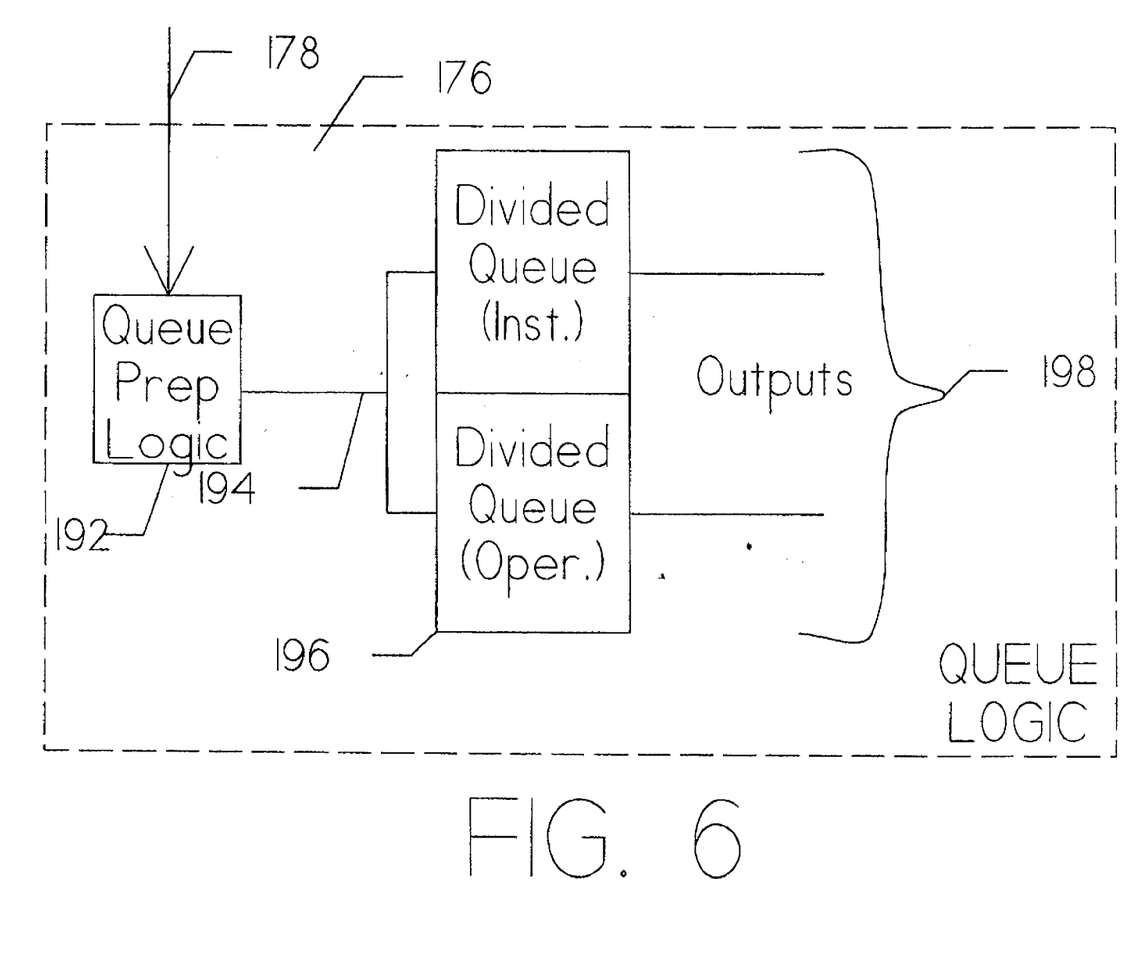
FIG. 6 is a detailed diagram showing a dedicated queue for each of the requesting processors.

FIG. 6 is detailed functional diagram showing the level two cache memory miss queue divided into two separate queues (i.e., one each for the program instruction interface and one for the operand fetch interface). In this preferred embodiment, queue preparation logic 192 determines routes the request by interface for queuing. Path 194 as fanned out directs the prepared request to the queue location within divided queue 196 corresponding to the requesting processor. Outputs 198 provide the system with the opportunity to honor the requests in the chosen order.

For instruction processor requests, priority is preferably given to read-only (i.e., program instruction) requests over read/write (i.e., operand transfer) requests. This will provide the least latency in the highly pipelined architecture of the preferred mode instruction processors.

Having thus described the preferred embodiments of the present invention, those of skill in the art will readily appreciate that the teachings found herein may be applied to yet other embodiments within the scope of the claims hereto attached.

We claim:

1. In a data processing system having a first instruction processor directly coupled to a system controller dedicated only to and accessible only by said first instruction processor wherein said system controller contains an internal cache memory within said system controller wherein said internal cache memory has an instruction interface and an operand interface and wherein said first processor makes a first plurality of instruction memory access requests of said internal cache memory via said instruction interface and wherein a second plurality of said instruction memory access requests of said internal cache memory via said instruction interface result in a third plurality of cache misses and wherein said first instruction processor makes a fourth plurality of operand memory access requests of said internal cache memory via said operand interface and wherein a fifth plurality of said operand memory access requests of said internal cache memory via said operand interface result in a sixth plurality of cache misses, the improvement comprising:
 a. a first queue directly coupled to said instruction interface for queuing said third plurality of cache misses and a second queue directly coupled to said operand interface for queuing said sixth plurality of cache misses.

2. The improvement according to claim 1 further comprising a seventh plurality of instruction processors wherein each of said seventh plurality of instruction processors includes an instruction interface and an operand interface.

3. The improvement according to claim 2 wherein each of said seventh plurality of instruction processors is directly coupled to a different one of a plurality of dedicated system controller.

4. The improvement according to claim 3 wherein said first queue and said second queue each store one cache miss.

5. The improvement according to claim 4 wherein said seventh plurality equals sixteen.

6. An apparatus comprising:
 a. a system controller containing a second level cache memory wherein said second level cache memory has a instruction interface and a operand interface;
 b. a first processor having a first level instruction cache memory directly coupled to said second level cache memory within said system controller via said instruction interface and a first level operand cache memory coupled to said second level cache memory within said system controller via said operand interface;
 c. a first queue for queuing requests from said first level instruction cache memory resulting in a miss at said second level cache memory; and
 d. a second queue for queuing request from said first level operand cache memory resulting in a miss at said second level cache memory.

7. An apparatus according to claim 6 further comprising a plurality of additional processors.

8. An apparatus according to claim 7 wherein each of said plurality of additional processors has a dedicated one of a plurality of system controllers.

9. An apparatus according to claim 8 wherein said first level instruction cache memory is an instruction fetch, read-only cache memory.

10. An apparatus according to claim 9 wherein said first level operand cache memory is an operand fetch read/write cache memory.

11. A method of handling memory requests comprising:
 a. receiving by a system controller a first memory request from an instruction interface of a first processor;
 b. first determining whether said first memory request results in a first cache memory miss;
 c. queuing said first memory request in a first instruction queue when said first determining step determines that said first memory request has resulted in said first cache memory miss;
 d. receiving by said system controller a second memory request from an operand interface of said first processor;
 e. second determining whether said second memory request results in a second cache memory miss; and
 f. queuing said second memory request in a second operand queue when said second determining step determines that said second memory request has resulted in said second cache memory miss.

12. A method according to claim 11 wherein said instruction interface further comprises a program instruction fetch interface.

13. A method according to claim 12 wherein said operand interface further comprises an operand fetch interface.

14. A method according to claim 13 wherein said first instruction queue takes priority over said second operand queue.

15. A method according to claim 14 further comprising a plurality of instruction processors.

16. An apparatus comprising:
 a. first requesting means for requesting data via a first interface;
 b. second requesting means for requesting data via a second interface;
 c. providing means directly coupled to said first data requesting means via said first interface and said second data requesting means via said second interface for providing said data in response to said first data requesting means and said second data requesting means;

d. caching means located within said providing means for temporarily storing some of said data;

e. first means located within said providing means and directly coupled to said caching means for storing said request for data from said first data requesting means if said requested data is not temporarily stored within said caching means; and f. second means located within said providing means and directly coupled to said caching means for storing said request for data from said second requesting and processing means if said requested data is not temporarily stored within said caching means.

17. An apparatus according to claim 16 wherein said first requesting means further comprises:

a. means for requesting program instructions.

18. An apparatus according to claim 17 wherein said second requesting means further comprises:

a. means for requesting operands.

19. An apparatus according to claim 18 further comprising instruction processing means and wherein said first requesting means and second requesting means are located within said instruction processing means.

20. An apparatus according to claim 19 further comprising a system controller and wherein said providing means is located within said system controller.

* * * * *